United States Patent
Bartelmuss et al.

(10) Patent No.: US 6,287,008 B1
(45) Date of Patent: Sep. 11, 2001

(54) DEVICE FOR ADJUSTING A BEARING BLOCK OF A ROLLER IN A ROLLER GROUP

(76) Inventors: Klaus Bartelmuss; Heinz Bartelmuss, both of NR. 63, 8833 Teufenbach (AT)

( * ) Notice: Subject to any disclaimer, the term of this patent is extended or adjusted under 35 U.S.C. 154(b) by 0 days.

(21) Appl. No.: 09/324,821

(22) Filed: Jun. 2, 1999

(30) Foreign Application Priority Data

Jun. 16, 1998 (AT) ................................................. 1030/98

(51) Int. Cl.$^7$ ............................ F16C 23/00; F16C 17/00; F16C 33/00; B65G 39/16
(52) U.S. Cl. ............................ 384/247; 384/26; 384/42; 198/806
(58) Field of Search ............................ 384/247, 256, 384/260, 42, 26, 29; 198/806, 807, 842, 813, 816; 226/21, 22, 23, 170, 198

(56) References Cited

U.S. PATENT DOCUMENTS

| | | | | |
|---|---|---|---|---|
| 2,602,708 | * | 7/1952 | Wheildon, Jr. ........................ | 384/42 |
| 3,043,062 | * | 7/1962 | Wettstein ............................... | 384/29 |
| 3,333,513 | * | 8/1967 | Wettstein ........................... | 384/29 X |
| 3,921,793 | * | 11/1975 | Hutchinson et al. ................. | 198/208 |
| 4,518,205 | * | 5/1985 | Heathe ................................... | 384/29 |
| 4,544,061 | * | 10/1985 | Crandall ................................ | 198/813 |
| 5,033,869 | * | 7/1991 | Kingston et al. ................... | 384/29 X |
| 5,054,608 | * | 10/1991 | Bryant ................................... | 198/816 |
| 5,699,898 | * | 12/1997 | Bartelmuss et al. .................. | 198/806 |
| 5,749,659 | * | 5/1998 | Nisley ................................... | 384/260 |
| 5,758,545 | * | 6/1998 | Fevre et al. ......................... | 384/42 X |
| 5,887,982 | * | 3/1999 | Wilcher .................................. | 384/97 |
| 5,896,979 | * | 4/1999 | Hokari et al. ......................... | 198/807 |

FOREIGN PATENT DOCUMENTS

0733736A2  9/1996 (EP) .

* cited by examiner

Primary Examiner—Richard M. Lorence
Assistant Examiner—Roger Pang
(74) Attorney, Agent, or Firm—Herbert L. Lerner; Laurence A. Greenberg; Werner H. Stemer

(57) ABSTRACT

The device allows a lateral bearing block of a roller in a roller group for supporting and moving an endless moved web to be adjusted. The endless web may be a traveling screen, conveyor belt or the like in papermaking plant. When the slide carrying the lateral bearing block is displaced by an actuator along at least one guide rail, it is displaced relative to a frame in the conveying direction of the roller section. As a result, the angular orientation of the rotational axis of the roller mounted in the bearing block is varied. A sliding element is releasably fastened to the slide. The sliding element, which is produced from a highly slideable material, is disposed between the slide and the at least one guide rail.

7 Claims, 4 Drawing Sheets

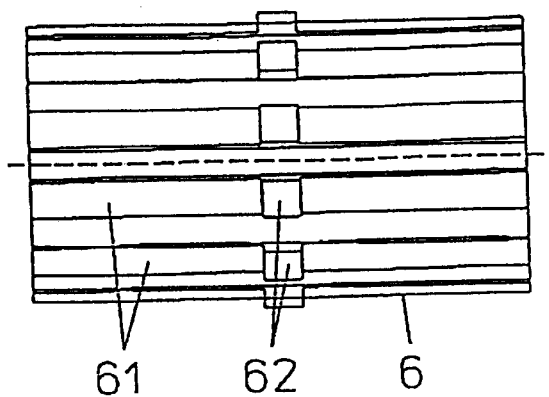 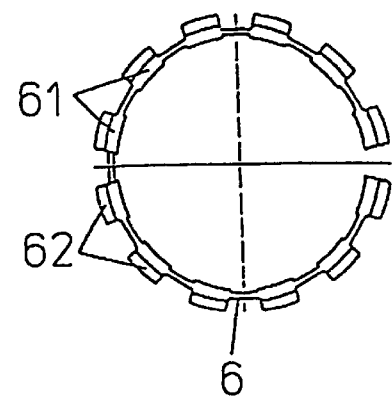
Fig. 5A   Fig. 5B
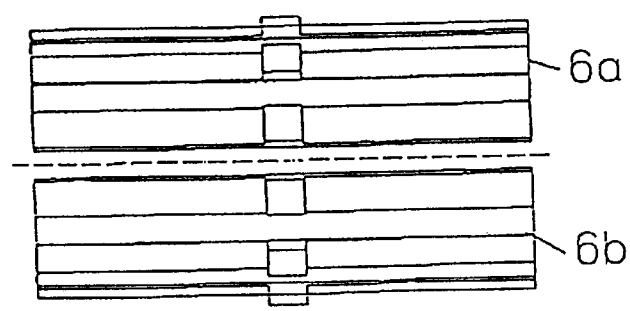 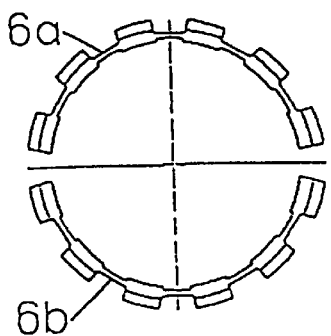
Fig. 5C   Fig. 5D
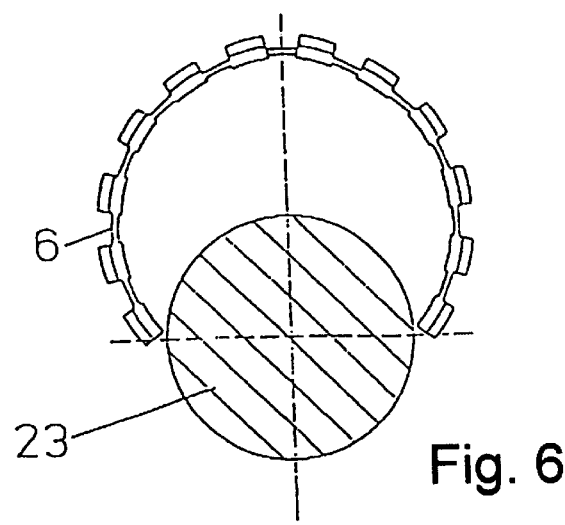
Fig. 6

DEVICE FOR ADJUSTING A BEARING BLOCK OF A ROLLER IN A ROLLER GROUP

BACKGROUND OF THE INVENTION

FIELD OF THE INVENTION

The present invention relates to a device for adjusting one of the bearing blocks of a roller in a roller group for supporting and moving an endless moved web, such as the traveling screen or conveyor belt in a papermaking plant. The bearing block is disposed on a slide which is adjustable along at least one guide rail and which can be adjusted relative to a carrying structure in the conveying direction of the roller section by an actuating device. As a result, the angular position of the roller mounted in the bearing block is variable relative to the conveying direction of the roller section.

In plants in which an endless moved web is guided via a multiplicity of mutually adjacent rollers, such as, for example, in a papermaking plant using a traveling screen which is guided via a multiplicity of successive rollers, there is the requirement that the direction of movement of the band coincides exactly with the conveying direction of the roller section. By contrast, insofar as the direction of movement of the band deviates from the conveying direction of the roller section due to irregularities in the band or rollers or for other reasons, with the result that the direction of movement of the band forms an acute angle with the conveying direction of the roller section, this not only leads to inadmissible loads on the band, but, moreover, the band may creep laterally out of the roller section, thus causing operating faults.

It has been known in the art, for monitoring the direction of movement of the band which is guided via a roller section, to provide a measuring means, by which inadmissible deviations of the direction of movement of the band from the conveying direction of the roller section are detected. In response to the monitoring it is possible to take corrective mn in order to correct the direction of movement of the band. Correction is possible, in this case, due to the fact that the angular position of one or a plurality of the rollers of the roller section is varied slightly.

The orientation of a roller of the roller section can be varied by adjusting one of the two bearing blocks in the conveying direction of the roller section. For that purpose, a piston/cylinder assembly is arranged below the bearing block. The cylinder is thereby rigidly fastened in the structure of the plant below the bearing block and, furthermore, the bearing block is carried by the piston which can be adjusted in the conveying direction of the roller section within the cylinder. By the displacement of the piston, the angular orientation of the roller carried by the bearing block relative to the conveying direction of the roller section can be adjusted, with the result that the direction of movement of the band can be influenced.

The prior art system is disadvantageous, however, in that the forces absorbed by the bearing block are transmitted via the piston to the cylinder, thus causing a high load to be exerted on the seals between the piston and the cylinder. Moreover, the prior art device is disadvantageous in that the piston/cylinder assembly is located below the associated bearing block. Access to the piston/cylinder assembly for maintenance or repair is difficult.

European published patent application EP 733 736 A2 discloses a device that avoids this disadvantage by providing, on the slide, a carriage which is provided with running rollers and which can be moved relative to the carrying structure by a further actuator. Even though that prior art device is advantageous relative to the previously known art, it nevertheless has the disadvantage that it must be dismantled completely if the running rollers or other components are damaged or broken, so that the damaged or inoperative components can be removed and replaced with new components.

SUMMARY OF THE INVENTION

It is accordingly an object of the invention to provide a device for adjusting a bearing block of a roller in a roller group, which overcomes the above-mentioned disadvantages of the heretofore-known devices and methods of this general type and which avoids components, such as running rollers, which are at risk of breakage or are susceptible to faults, and in which the components exposed to wear due to the actuating movements are easily accessible and can be exchanged, without the entire device having to be dismantled.

With the foregoing and other objects in view there is provided, in accordance with the invention, a device for adjusting a bearing block of a roller supporting an endless web traveling along a conveying direction, such as, for instance, a traveling screen, a conveyor belt, or the like in a papermaking plant. The device comprises:

a carrying structure, such as a stationary machine frame, and at least one guide rail (or a plurality of mutually spaced-apart, parallel guide rails) mounted to the carrying structure;

a slide connected to and adjustable along the guide rail;

a bearing block disposed on the slide;

an adjusting actuator for adjusting the slide along the guide rail for displacing the slide relative to the carrying structure in a conveying direction; and a sliding element of a highly slideable material releasably fastened on the slide and arranged between the slide and the guide rail.

By adjusting the bearing block of a lateral roller bearing, the orientation of the rotational axis of the roller is adjusted relative to the conveying direction of a web supported on the roller.

In accordance with an added feature of the invention, a fastening element is releasably fastened to the slide for fixing a position of the sliding element.

In accordance with an additional feature of the invention, the guide rail is a cylindrical rod, and the sliding element is a sleeve.

In accordance with another feature of the invention, the sliding element is a slotted sleeve.

In accordance with a further feature of the invention, the sliding element is a multipart sliding element, for instance a two-part sliding element.

In accordance with again an added feature of the invention, the sliding element is formed with a profiling on its outer peripheral surface and its inner peripheral surface.

In accordance with again an additional feature of the invention, the profiling comprises ribs extending in an actuating direction, i.e. parallel to the guide rail.

In accordance with a concomitant feature of the invention, the sliding element is formed with an annular rib on its outer peripheral surface, and the slide is formed with a corresponding annular groove adapted to receive the annular rib.

Other features which are considered as characteristic for the invention are set forth in the appended claims.

Although the invention is illustrated and described herein as embodied in a device for adjusting one of the bearing blocks of a roller in a roller group, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 5A is a side elevational view of a first embodiment of a sliding sleeve;

FIG. 5B is an end view thereof;

FIG. 5C is a side elevational view of a second embodiment of the sliding sleeve;

FIG. 5D is an end view thereof; and

FIG. 6 is an end view of the first sliding sleeve at a stage when it is attached to a guide rod.

DESCRIPTION OF THE PREFERRED EMBODIMENTS

Figure 1:
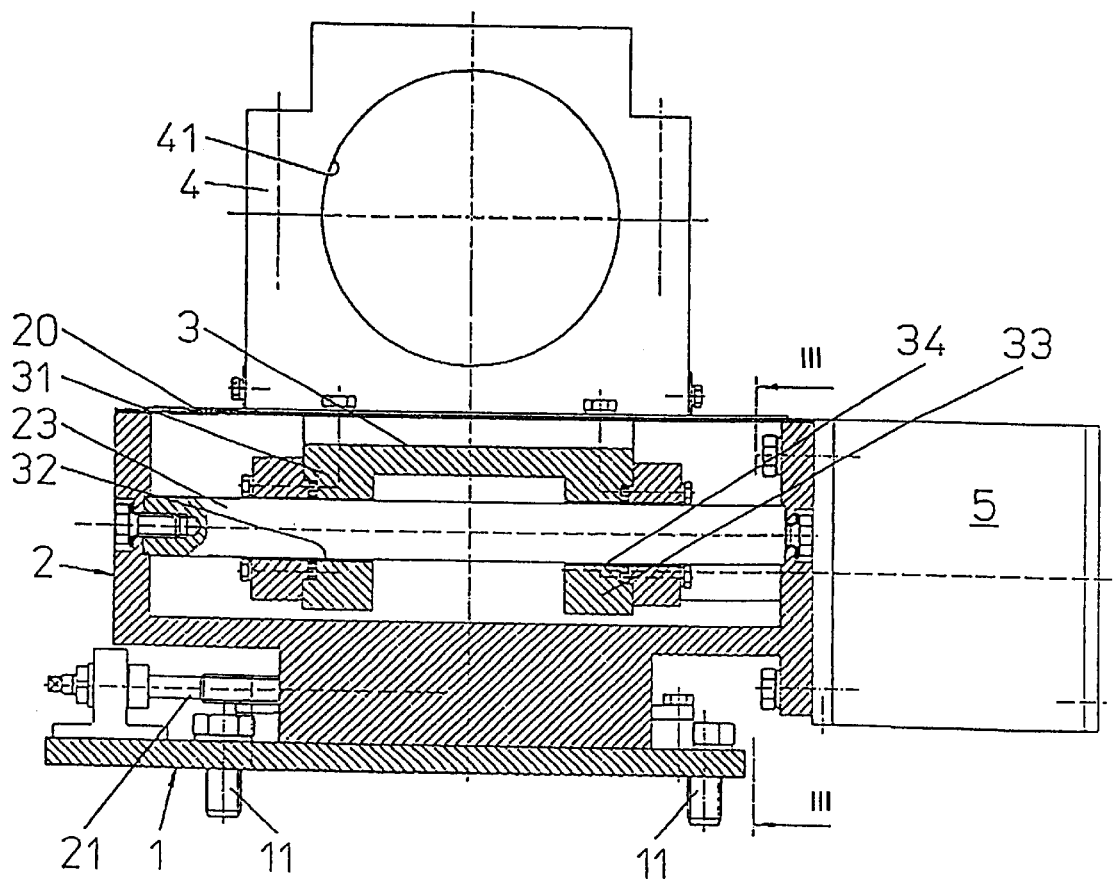
FIG. 1 is a sectional view of a device according to the invention taken along the line I—I in FIG. 3.
Figure 2:
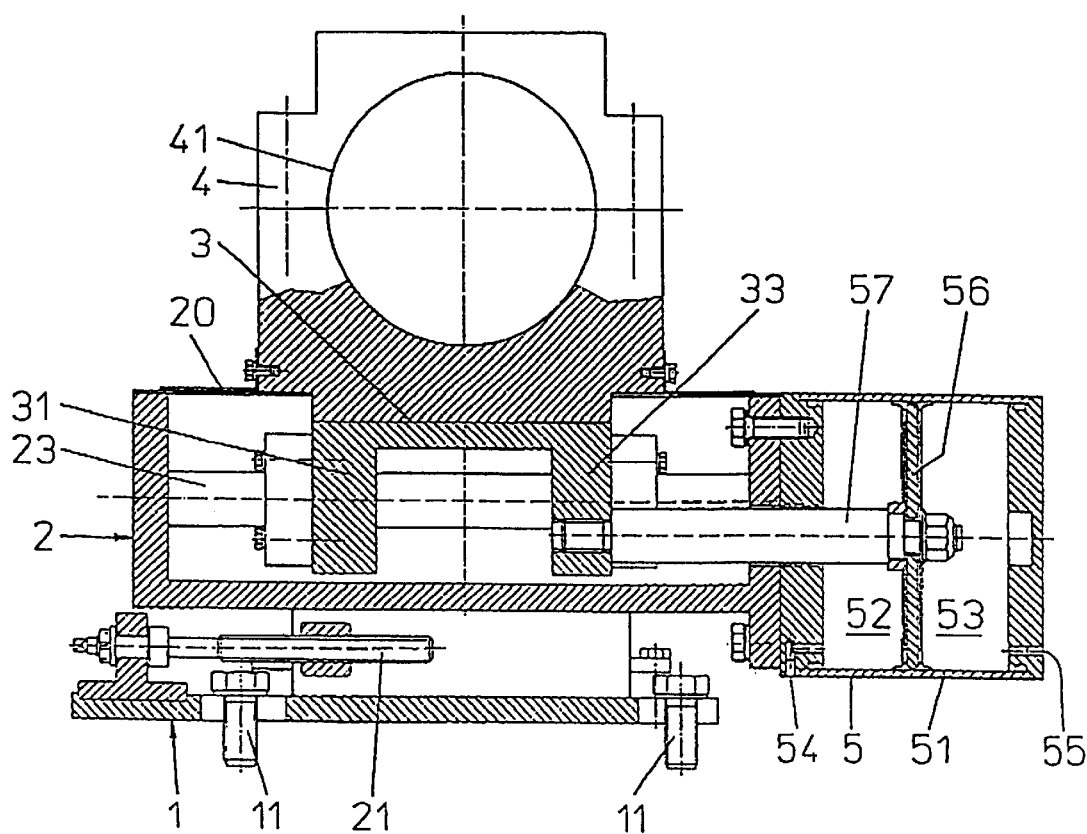
FIG. 2 is a sectional view of the device according to the invention taken along the line II—II in FIG. 3.
Figure 3:
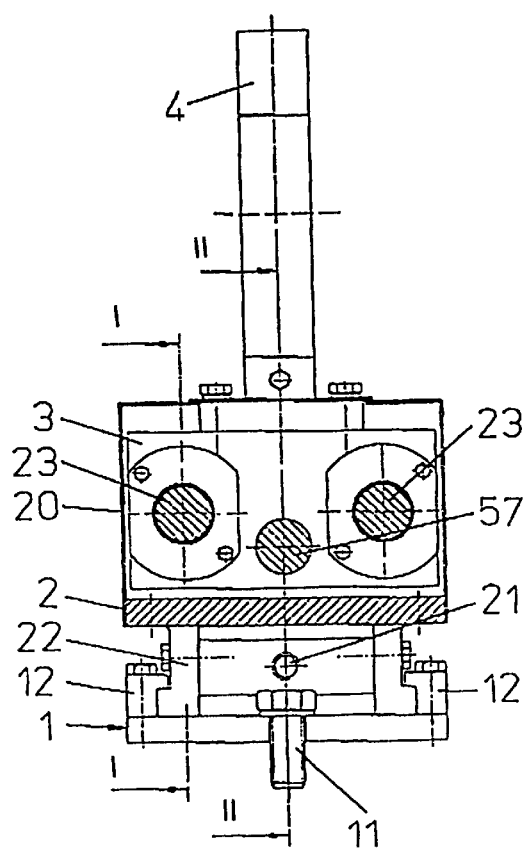
FIG. 3 is a sectional view of the device taken along the line III—III in FIG. 1.

Referring now to the figures of the drawing in detail and first, particularly, to FIGS. 1, 2 and 3 thereof, there is seen a device according to the invention which includes a carrying plate 1 fastened by means of screw bolts 11 to a structure of a plant which has a multiplicity of rollers for supporting and moving an endless band. The carrying plate 1 is formed with slots through which the screw bolts 11 pass. Accordingly, the plate 1 can be adjusted in the conveying direction of the roller section. Furthermore, the carrying plate 1 is formed with lateral, upwardly projecting flanges 12. A slide 2 is guided in the flanges 12. The slide 2 can likewise be adjusted in the conveying direction of the roller section by means of a spindle 21.

The lower section of the slide 2 has a box-shaped profile 22 which is guided between the flanges 12 of the carrying plate 1. At the top, the slide 2 has two guide rods 23 which serve to guide a second slide 3. A bearing block 4 is rigidly fastened to the slide 3. The bearing block 4 has a bearing 41 for one of the rollers of the roller section. The second slide 3, which is U-shaped in longitudinal section, is formed in each case with two bores 32 and 34 which are arranged in the two legs 31 and 33 and through which the guide rods 23 pass.

A piston/cylinder assembly 5 is disposed laterally outside the bearing block 4 and serves to displace the second slide 3. The piston/cylinder assembly 5 consists of a cylinder 51 with two chambers 52 and 53 that can be acted upon by a pressure medium via orifices 54 and 55. A piston 56 is arranged within the cylinder chambers 52 and 53. The position of the piston 56 (i.e., the relative sizes of the two chambers 52 and 53) is adjusted by feeding one of the cylinder chambers 52 or 53 with the pressure medium. The piston 56 is connected releasably to the leg 33 of the second slide 3 by means of a piston rod 57. The entire device is surrounded by a housing 20 which is also releasable, with the result that it can be removed from the first slide 2. The guide rods 23 and the second slide 3, displaceable along the latter, are thereby accessible.

Figure 4:
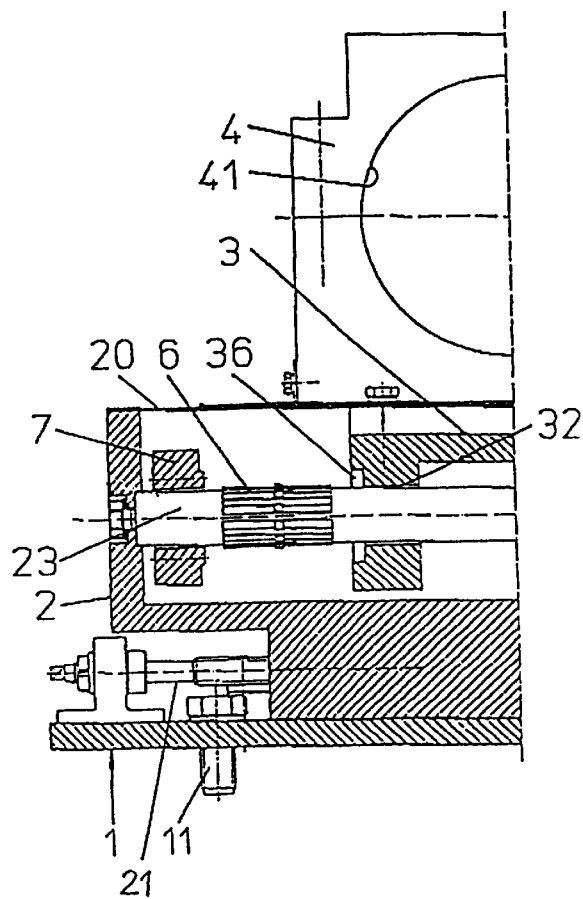
FIG. 4 is a sectional view of a detail of FIG. 1, on an enlarged scale.

With reference to FIG. 4, sliding sleeves 6 are provided for mounting the second slide 3 on the guide rods 23. The sliding sleeves are inserted into the bores 32 and 34 of the second slide 3. With particular reference to FIGS. 5A and 5B, the sliding sleeves 6 are designed with ribs 61 on their outer surface and on their inner surface. Moreover, the sliding sleeves 6 are formed with projections 62 that run along a ring and that are assigned an annular groove 36 in each case in the legs 31 and 33.

There is also provided a fastening sleeve 7, which surrounds the guide rods 23 assigned to it in each case. The fastening sleeves 7 can be screwed to the associated legs 31 and 33 of the second slide 3. As a result, the sliding sleeves 6 inserted into the bores 32 and 34 are fixed in position. The sliding sleeves 6 are produced from a polymer which contains fibers and solid lubricants.

As illustrated in FIGS. 5C and 5D, the sliding sleeves may also consist of two semicylindrical parts 6a and 6b.

The mode of operation of the device will now be described in detail:

The first slide 2 is adjusted with the spindle 21 into a position in which the bearing block 4 assumes a middle position. The roller mounted in the latter forms a right angle relative to the conveying direction of the roller section. If the angular position of one roller or a plurality of rollers is to be adjusted relative to the conveying direction of the roller section, so as to correct the movement of the band which rests on the rollers, then one of the inner chambers 52 and 53 of the cylinder 5 is acted upon by the pressure medium via one of the orifices 54 and 55. As a result, the piston 56 is adjusted. The second slide 3 is thereby displaced by means of the piston rod 57 and the bearing block 4 is adjusted in the conveying direction of the roller section. The angular position (the rotational axis) of the roller mounted in the bearing block 4 relative to the conveying direction of the roller section is thereby adjusted. As a consequence, the direction of movement of the band is corrected.

Since the loads absorbed by the bearing block 4 are transmitted via the sliding sleeves 6 of the second slide 3 to the first slide 2, it is necessary, in order to displace the second slide 3, merely to overcome the sliding friction caused thereby. Since the drive cylinder 5 is disposed laterally outside the roller carried by the bearing block 4, the drive cylinder is easily accessible for maintenance purposes.

If it is necessary to replace one of the sliding sleeves 6 with a new one, the cover 20 is removed and the fastening sleeves 7 are released from the legs 31 and 33 of the second slide 3 and displaced along the guide rods 23. The sliding sleeves 6 can thereby also be displaced until they are located completely outside the bores 32 and 34. Since the sliding sleeves 6 are slotted and are elastically deformable, they can be removed from the guide rods 23 and replaced by new sliding sleeves 7, as illustrated in FIG. 6. Insofar as the sliding sleeves 6 are in two parts (FIGS. 5C, 5D), they can just as easily be removed and replaced by new ones.

Due to the fact that the second slide 3 is adjustable along sliding guides, substantially higher loads can be absorbed by it than by rolling mountings provided on a carriage. On the other hand, because of the availability of new materials which exhibit extremely low resistance to sliding friction and from which the sliding sleeves 6 are produced, there is no need for any increased actuating forces to be exerted by the actuating cylinders.

We claim:

1. A device for adjusting a bearing block of a roller supporting an endless web travelling along a conveying direction, comprising:

a carrying structure;

a guide rail mounted to said carrying structure;

a slide for carrying the bearing block connected to and adjustable along said guide rail, said slide having a bore formed therein and said guide rail extending through said bore;

an adjusting actuator for adjusting said slide along said guide rail for displacing said slide relative to said carrying structure in the conveying direction; and a sliding element of a highly slideable material disposed between said slide and said guide rail, said sliding element being a slotted sleeve encompassing said guide rail and being removably mounted thereon.

2. The device according to claim 1, which further comprises a fastening element releasably fastened to said slide for fixing a position of said sliding element.

3. The device according to claim 1, wherein said guide rail is a cylindrical rod, and said sliding element is a sleeve.

4. The device according to claim 1, wherein said sliding element is formed with a profiling on an outer peripheral surface and an inner peripheral surface thereof.

5. The device according to claim 4, wherein said profiling comprises ribs oriented in an actuating direction.

6. The device according to claim 2, wherein said sliding element is formed with an annular rib on an outer peripheral surface thereof, and said slide is formed with a corresponding annular groove for meshing with said annular rib.

7. The device according to claim 1, wherein said guide rail is one of a plurality of mutually spaced-apart, parallel guide rails.

* * * * *